United States Patent

Sentoku et al.

(12) United States Patent
(10) Patent No.: US 6,943,542 B2
(45) Date of Patent: Sep. 13, 2005

(54) SEALED WHEEL SPEED DETECTOR WITH ROTATING MAGNETIC RING AND STATIONARY MAGNETIC SENSOR

(75) Inventors: Minoru Sentoku, Ikoma-gun (JP); Motoshi Kawamura, Kitakatsuragi-gun (JP); Kazutoshi Toda, Tondabayashi (JP); Nobuyuki Seo, Yamatokooriyama (JP); Naoki Morimura, Kashiba (JP); Tomohiro Ishii, Yamtotakada (JP); Kanichi Kouda, Kashiwara (JP); Yoshifumi Shige, Kashiwara (JP); Fujio Harumi, Hirakata (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/425,712

(22) Filed: Apr. 30, 2003

(65) Prior Publication Data

US 2003/0205999 A1 Nov. 6, 2003

Related U.S. Application Data

(63) Continuation of application No. 09/584,406, filed on Jun. 1, 2000, now Pat. No. 6,605,938.

(30) Foreign Application Priority Data

Jun. 2, 1999 (JP) .............................. 11-154964

(51) Int. Cl.[7] .......................... G01P 3/487; G01B 7/30; F16C 19/00

(52) U.S. Cl. .................. 324/174; 324/207.25; 384/448

(58) Field of Search ................. 324/173–174, 324/207.22, 207.25; 384/448

(56) References Cited

U.S. PATENT DOCUMENTS

| | | | | |
|---|---|---|---|---|
| 4,948,277 A | * | 8/1990 | Alff | 324/174 |
| 5,296,805 A | * | 3/1994 | Clark et al. | 324/174 |
| 5,407,213 A | | 4/1995 | Ouchi et al. | |
| 5,434,503 A | * | 7/1995 | Rigaux et al. | 324/174 |
| 5,451,869 A | * | 9/1995 | Alff | 324/173 |
| 5,530,344 A | * | 6/1996 | Caillaut et al. | 324/174 |
| 5,567,058 A | * | 10/1996 | Morita et al. | 324/174 |
| 5,614,822 A | | 3/1997 | Sakamoto et al. | |
| 5,670,874 A | | 9/1997 | Miyazaki et al. | |
| 5,695,289 A | | 12/1997 | Ouchi et al. | |
| 5,821,422 A | * | 10/1998 | Ouchi | 324/174 |
| 5,852,361 A | | 12/1998 | Ouchi et al. | |
| 2002/0167305 A1 | | 11/2002 | Sentoku et al. | |

FOREIGN PATENT DOCUMENTS

| | | |
|---|---|---|
| EP | 0 371 836 | 6/1990 |
| EP | 0 378 939 | 7/1990 |
| EP | 0 520 853 | 12/1992 |
| EP | 0 872 652 | 10/1998 |

\* cited by examiner

*Primary Examiner*—Jay Patidar
(74) *Attorney, Agent, or Firm*—Nixon & Vanderhye, P.C.

(57) ABSTRACT

This wheel speed detector is constructed of a magnetic sensor and a magnetic ring and is integrated with the inside of a seal device. The magnetic ring constitutes a part (core bar) of the seal device. This arrangement can enable the compacting and reduction in the number of components and improve space saving and assembling workability.

7 Claims, 12 Drawing Sheets

SEALED WHEEL SPEED DETECTOR WITH ROTATING MAGNETIC RING AND STATIONARY MAGNETIC SENSOR

This application is a continuation of application Ser. No. 09/584,406, filed Jun. 1, 2000, now U.S. Pat. No. 6,605,938.

BACKGROUND OF THE INVENTION

The present invention relates to a wheel speed detector that is intended to detect the rotating speed of a wheel and used for the antilock brake or the like of an automobile.

Conventionally, as a wheel speed detector of this type, there has been provided a detector that is provided with a magnetic sensor fixed to the fixed side of an inner wheel and an outer wheel and a magnetic ring arranged on the rotating side so as to face this magnetic sensor and detects the rotating speed of the wheel by detecting a magnetic field varied in accordance with the rotation of this magnetic ring by means of the magnetic sensor.

The wheel speed detector of the above type has conventionally been arranged independently of a seal device for sealing a space between the inner wheel and the outer wheel with respect to the outside. This accordingly requires a special-purpose space and disadvantageously leads to a lack of compactness. The above arrangement also requires certain consideration for the dispositional relation of the detector relative to the other components that constitute the wheels and accordingly leads to the problem that the workability in the assembling stage is not good.

SUMMARY OF THE INVENTION

Accordingly, the object of the present invention is to provide a compact wheel speed detector capable of saving space around the wheels and improving the workability.

In order to achieve the object, there is provided a wheel speed detector for detecting a relative rotating speed between an outer wheel and an inner wheel by means of a magnetic sensor in association with an opposite magnetic ring, wherein one of the outer wheel and the inner wheel is rotatable while the other is stationary, the magnetic ring is fixed to the rotatable wheel and the magnetic sensor is fixed to the stationary wheel, the magnetic ring and the magnetic sensor being integrated with a seal device for sealing a gap between the inner wheel and the outer wheel.

According to the present invention, the magnetic ring and the magnetic sensor are integrated with the seal device for sealing the gap between the inner wheel and the outer wheel. This arrangement can improve the compactness and the workability in the assembling stage.

In one embodiment of the present invention, the seal device has the magnetic ring and the magnetic sensor built-in.

According to the above construction, the seal device has the magnetic ring and the magnetic sensor built-in. This arrangement can enable the space saving around the wheels.

In one embodiment of the present invention, the magnetic ring is fixed to a rotatable member of the seal device for sealing the gap between the inner wheel and the outer wheel, and the magnetic sensor is fixed to a stationary member of the seal device.

According to the above construction, the magnetic ring and the magnetic sensor are integrated with the seal device by fixing the magnetic ring to the rotatable member of the seal device and fixing the magnetic sensor to the stationary member. This arrangement can enable the space saving around the wheels and improve the compactness and the workability in the assembling stage.

In one embodiment of the present invention, the magnetic ring and the magnetic sensor are arranged in a space where the rotatable member and the stationary member of the seal device face each other.

According to the above construction, the magnetic ring and the magnetic sensor are arranged in the space where the rotatable member and the stationary member of the seal device face each other. This arrangement can enable the space saving around the wheels and improve the compactness and the workability in the assembling stage.

In one embodiment of the present invention, a seal portion of the seal device is provided on both sides of the portion where the magnetic ring and the magnetic sensor face each other.

According to the above construction, the seal portion is provided on both sides of the oppositional portion where the magnetic ring and the magnetic sensor face each other. This can prevent water from intruding into the bearing inwardly of the magnetic sensor and prevent lubricant from leaking out of the bearing.

In one embodiment of the present invention, the magnetic ring and the magnetic sensor face each other obliquely with respect to the axis of rotation of the inner wheel and the outer wheel.

According to the above construction, the magnetic ring and the magnetic sensor, which face each other obliquely with respect to the axis of rotation of the inner wheel and the outer wheel, can be reduced in the radial dimension and compacted.

In one embodiment of the present invention, the stationary member of the seal device concurrently serves as a magnetic path of the magnetic sensor.

According to the above construction, the stationary member of the seal device concurrently serves as the magnetic path (yoke) of the magnetic sensor, and this can reduce the number of components for the achievement of compacting.

In one embodiment of the present invention, a seal portion constructed of a slinger and a seal lip to be brought in sliding contact with the slinger is provided axially outside the oppositional portion where the magnetic ring and the magnetic sensor face each other, and a main seal portion is provided between this seal portion and the oppositional portion.

According to the above construction, the additional seal portion constructed of the slinger and the axial seal lip is provided outside the main seal portion. This arrangement can improve the sealing performance and improve, in particular, the waterproof performance of the sensor portion.

In one embodiment of the present invention, the seal device is constructed of a rotatable member and a stationary member, the magnetic sensor is fixed to the stationary member, the magnetic ring is fixed to the rotatable member, and the magnetic ring is covered with a nonmagnetic elastic member.

According to the above construction, the magnetic ring is covered with the nonmagnetic elastic member. This arrangement can prevent the magnetic foreign material such as iron powder from adhering to the magnetic ring and prevent the occurrence of noises.

In one embodiment of the present invention, the stationary member and the rotatable member constitute a labyrinth seal, and the nonmagnetic elastic member is provided with an axial lip that extends in the axial direction and comes in sliding contact with the stationary member and a main lip that extends in the radial direction and comes in sliding contact with the stationary member.

According to the above construction, the labyrinth seal constructed of the stationary member and the rotatable member, the axial lip and the main lip can provide three-point sealing, and this can reliably prevent water from intruding into the bearing.

In one embodiment of the present invention, the nonmagnetic elastic member is provided with an auxiliary lip that comes in sliding contact with the stationary member inside the main lip.

According to the above construction, the auxiliary lip brought in sliding contact with the stationary member inside the main lip is provided, and this can further improve the waterproof performance.

In one embodiment of the present invention, the stationary member is made of austenite-based stainless steel, copper or aluminum.

According to the above construction, the stationary member for fixing the magnetic sensor is made nonmagnetic with the material of austenite-based stainless steel, copper or aluminum. This arrangement can improve the magnetic detection accuracy of the magnetic sensor.

In one embodiment of the present invention, the seal device is constructed of a rotatable member and a stationary member, an axial lip that extends axially outwardly of an axial outer surface of the rotatable member and comes in sliding contact with an axial inner surface of the stationary member is provided, the magnetic ring is fixed to an axial inner surface of the rotatable member, and the magnetic sensor is fixed to an axial outer surface of the stationary member.

According to the above construction, the magnetic ring is fixed to the inner surface of the rotatable member, and the axial lip is fixed to the outer surface of the rotatable member. This arrangement can magnetize the magnetic ring from inside the rotatable member without being obstructed by the axial lip and facilitate the manufacturing.

In one embodiment of the present invention, the rotatable member is a magnetic body.

According to the above construction, the rotatable member to which the magnetic ring is fixed is nonmagnetic, and this can increase the magnetic force of the magnetic ring.

In one embodiment of the present invention, the magnetic ring and the magnetic sensor face each other in the radial direction.

According to the above construction, the magnetic ring and the magnetic sensor face each other in the radial direction, and this can reduce the axial dimension and achieve compacting in the axial direction.

In one embodiment of the present invention, the seal device is constructed of a rotatable member and a stationary member, the magnetic ring is fixed to the rotatable member, the magnetic sensor is fixed to the stationary member and there are provided a main lip that is fixed to the rotatable member or the stationary member and seals a path between the rotatable member and the stationary member, a first auxiliary lip located inside the main lip, an axial lip located outside the main lip and a second auxiliary lip located outside the axial lip.

According to the above construction, the second auxiliary lip located outside the axial lip is provided in addition to the main lip, the first auxiliary lip and the axial lip, and this can improve the sealing performance. The second auxiliary lip prevents muddy water from directly splashing on the axial lip, and this can improve muddy water resistance.

In one embodiment of the present invention, the inner wheel is rotatable, and the second auxiliary lip is fixed to the rotatable member fixed to the inner wheel and extends radially outwardly to seal a path between the rotatable member and the stationary member.

According to the above construction, the second auxiliary lip is fixed to the rotatable member fixed to the rotatable inner wheel located, and therefore, a centrifugal force in the rotating stage presses the second auxiliary lip against the stationary member located radially outside. This arrangement can improve the sealing performance in the rotating stage.

In one embodiment of the present invention, a cover member for covering the magnetic sensor is provided, the cover member has an inclined surface inclined relative to the axis of rotation of the outer wheel and the inner wheel and a harness connected to the magnetic sensor is projecting from the inclined surface.

According to the above construction, the harness is made to project from the inclined surface of the cover member of the magnetic sensor, and this can widen the harness outlet width.

In one embodiment of the present invention, the seal device is constructed of a rotatable member and a stationary member, a magnetic ring and a magnetic sensor are fixed to an axial oppositional portion where the rotatable member and the stationary member face each other, and a cover member for covering the magnetic sensor has one or more ring-shaped projections that form a labyrinth in a path that extends in the radial direction between the rotatable member and the stationary member.

According to the above construction, the cover member for covering the magnetic sensor fixed to the stationary member has the ring-shaped projection, and this ring-shaped projection forms the labyrinth in the path that extends in the radial direction between the stationary member and the rotatable member. This arrangement accordingly obviates the need for forming an axial lip for sealing the path in the radial direction on the rotatable member. Therefore, the axial lip does not become an obstacle in magnetizing the magnetic ring fixed to the radial portion of the rotatable member, allowing the manufacturing to be facilitated.

In one embodiment of the present invention, the seal device is constructed of a rotatable member and the stationary member, the magnetic ring is fixed to the rotatable member, the magnetic sensor is fixed to the stationary member and at least part of the magnetic sensor is arranged in a hole formed through the stationary member.

According to the above construction, at least part of the magnetic sensor is arranged in the hole formed in the stationary member. This arrangement can promote the space saving and provides excellent mountability in the case of a small space.

In one embodiment of the present invention, all seal lips are fixed to the stationary member to which the magnetic sensor is fixed.

According to the above construction, all the seal lips are fixed to the stationary member to which the magnetic sensor is fixed, and this simplifies the structure.

In one embodiment of the present invention, the stationary member has a removable cover metal fitting, and the magnetic sensor is mounted on the cover metal fitting.

According to the above construction, the magnetic sensor is mounted on the removable cover metal fitting, and this facilitates the replacement of the magnetic sensor.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
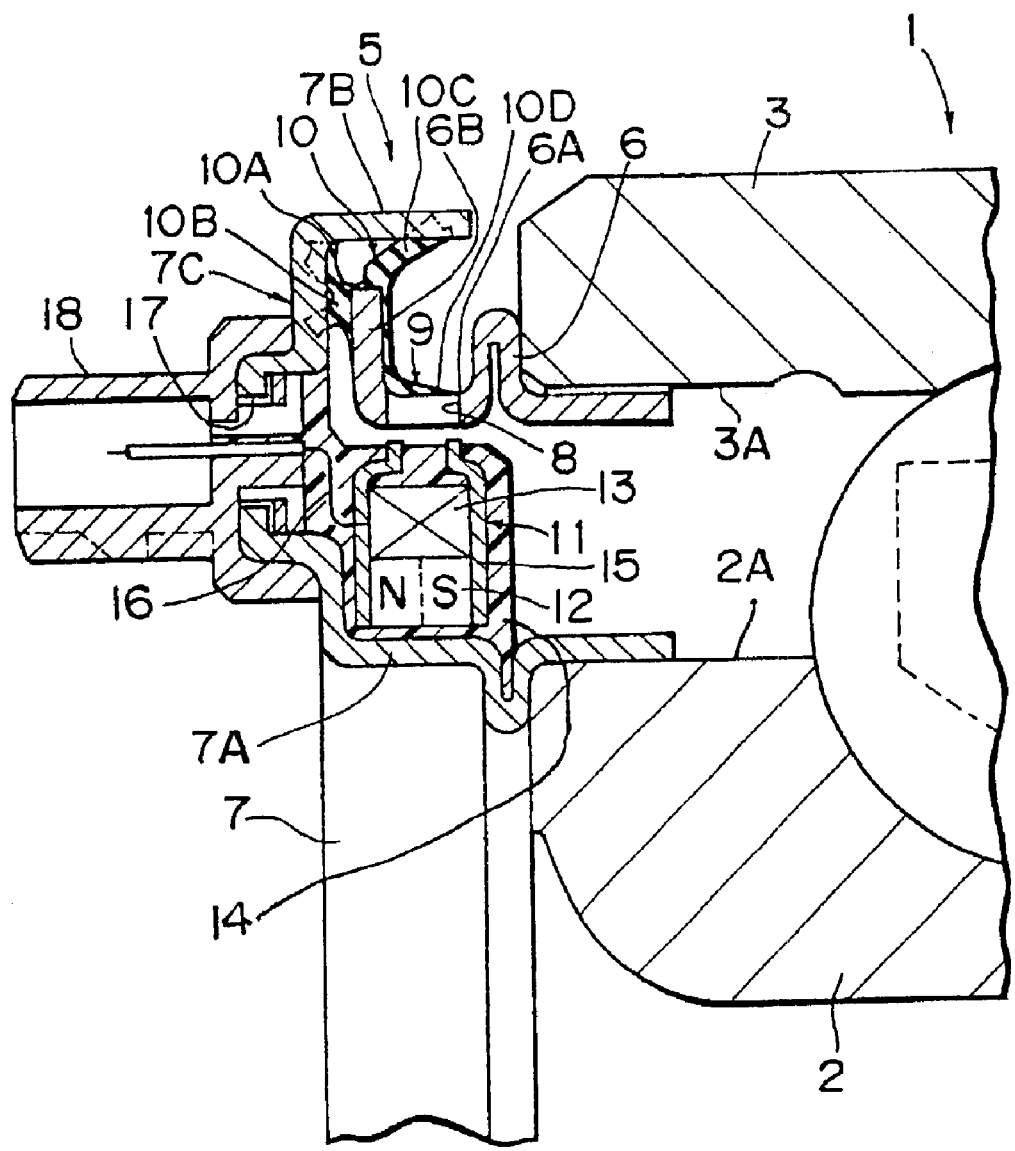
FIG. 1 is a sectional view of a wheel speed detector according to a first embodiment of the present invention.

The present invention will be described in detail below on the basis of the embodiments thereof shown in the drawings.

<First Embodiment>

FIG. 1 shows the wheel speed detector of the first embodiment of the present invention. The wheel speed detector of the present first embodiment is integrated into a seal device 5 that seals a space between an inner wheel 2 and an outer wheel 3 of a ball bearing 1.

The seal device 5 is provided with a core bar 6 fixed to an inner peripheral surface 3A of the outer wheel 3 located on the rotating side and a slinger 7 fixed to an outer peripheral surface 2A of the inner wheel 2 located on the stationary side. The core bar 6 has a cylindrical portion 6A that is projecting in the axial direction from the outer wheel 3 and a flange portion 6B that extends from this cylindrical portion 6A outwardly in the radial direction. The cylindrical portion 6A is provided with a plurality of windows 8 at specified intervals in the circumferential direction, and a seal lip 10 made of a nonmagnetic elastic member is fixed to the flange portion 6B. The cylindrical portion 6A constitutes a magnetic ring 9 of the wheel speed detector. Further, the seal lip 10 has a main lip 10A, an auxiliary lip 10B and an axial lip 10C. The seal lip 10 has a lid portion 10D that closes the windows 8 of the cylindrical portion 6A.

On the other hand, the slinger 7 is constructed of an inner cylindrical portion 7A, an outer cylindrical portion 7B and a disk portion 7C that connects the inner cylindrical portion 7A with the outer cylindrical portion 7B. A magnetic sensor 11 is fixed to the inner peripheral surface of the inner cylindrical portion 7A. This magnetic sensor 11 is constructed of a magnet 12, a coil 13 and a yoke 15. This magnetic sensor 11 faces from inside the cylindrical portion 6A provided with the windows 8 that constitute the magnetic ring 9. A signal line 16 is connected to this coil 13. The signal line 16 is led outwardly in the axial direction through a cylindrical hole 17 formed in the disk portion 7C of the slinger 7. A cylindrical connector 18 is fit in the cylindrical hole 17 of the slinger 7, and the signal line 16 passes through the approximate center of this connector 18.

The disk portion 7C of the slinger 7 faces the flange portion 6B of the core bar 6, and the main lip 10A and the auxiliary lip 10B fixed to this flange portion 6B are brought in sliding contact with the disk portion 7C. The axial lip 10C is brought in sliding contact with the inner peripheral surface of the outer cylindrical portion 7B of the slinger 7.

The cylindrical portion 6A of the core bar 6 that constitutes the magnetic ring 9 and the magnetic sensor 11 constitute the wheel speed detector of the present first embodiment. The magnetic sensor 11 is covered with a resin 14.

In the wheel speed detector having the above construction, the core bar 6 that constitutes the magnetic ring 9 integrally with the outer wheel 3 rotates when the outer wheel 3 rotates relative to the inner wheel 2, and a change in magnetic field due to the rotation of this magnetic ring 9 is detected by the magnetic sensor 11, and a signal that represents the rotating speed is taken out of the signal line 16. On the other hand, the seal device 5 prevents water and dust from intruding into the bearing from the outside by means of the seal lip 10 fixed to the core bar 6 and prevents lubricant from leaking out of the bearing.

The wheel speed detector of the present first embodiment is integrated with the inside of the seal device 5, and the magnetic ring 9 serves as part (core bar 6) of the seal device 5. This arrangement can achieve the compacting and reduction in the number of components and improves the space saving and assembling workability.

<Second Embodiment>

Figure 2:
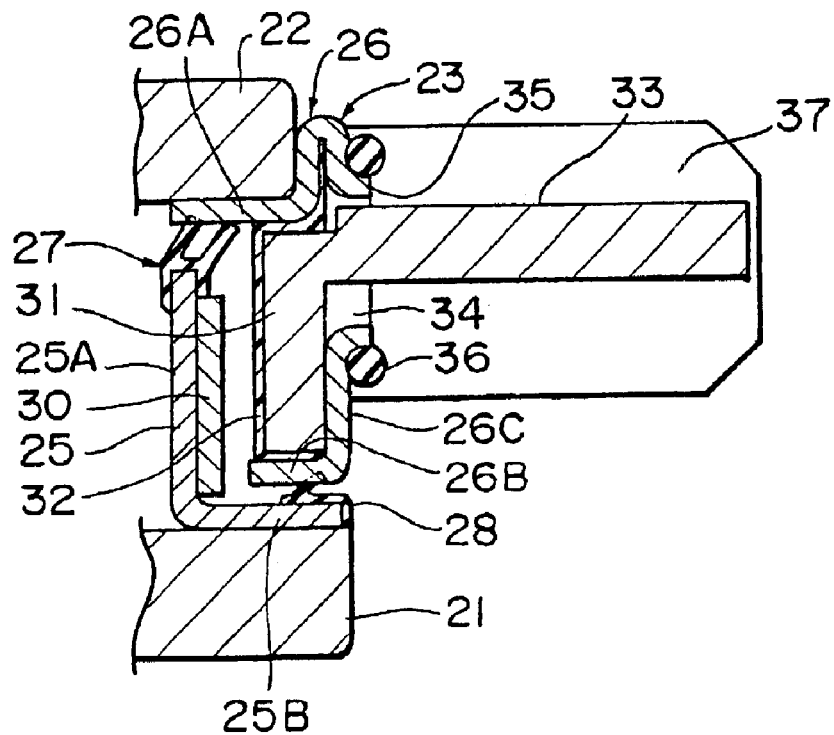
FIG. 2 is a sectional view of a wheel speed detector according to a second embodiment of the present invention.

Next, FIG. 2 shows the wheel speed detector of the second embodiment of the present invention. The present second embodiment is integrated with the inside of a seal device 23 for sealing a space between an inner wheel 21 and an outer wheel 22 of the bearing. This seal device 23 has a sectionally L-figured ring-shaped rotating side member 25 fixed to the outer peripheral surface of the inner wheel 21 and a ring-shaped stationary side member 26 fixed to the inner peripheral surface of the outer wheel 22. This stationary side member 26 is constructed of an outer cylindrical portion 26A, an inner cylindrical portion 26B and a disk portion 26C extending between both the cylindrical portions. Then, a sectionally H-figured seal lip 27 having a two-layer structure is fixed to the leading end of a flange portion 25A of the rotating side member 25, and this seal lip 27 is brought in sliding contact with the inner peripheral surface of the outer cylindrical portion 26A of the stationary side member 26. On the other hand, a seal lip 28 is fixed to the leading end of a cylindrical portion 25B of the rotating side member 25. This seal lip 28 is brought in sliding contact with the outer peripheral surface of the inner cylindrical portion 26B of the stationary side member 26.

On the other hand, a magnetized pulser ring 30 that serves as a magnetic ring is fixed to the axial outer surface of the flange portion 25A of the rotating side member 25. A magnetic sensor 31 is fixed to the inner surface of the disk portion 26C of the stationary side member 26 and axially faces the magnetized pulser ring 30. This magnetized pulser ring 30 is formed of a material obtained by mixing magnetic powder with a rubber or resin and is magnetized so that a north pole and a south pole are alternately arranged in the circumferential direction. On the other hand, the magnetic sensor 31 is constructed of a semiconductor circuit, and this magnetic sensor 31 is fit in a space between the outer cylindrical portion 26A and the inner cylindrical portion 26B of the stationary side member 26 and covered with a resin 32. A signal line 33 from the magnetic sensor 31 is led axially outwardly through a hole 34 formed in the disk portion 26C of the stationary side member 26 and arranged inside a cylindrical connector 37 mounted on an edge 35 of the hole 34 via an O-ring 36.

The magnetized pulser ring 30 and the magnetic sensor 31 constitute the wheel speed detector of the present embodiment. Even in the present embodiment, the magnetized pulser ring 30 and the magnetic sensor 31 are integrated with the inside of the seal device 23. This arrangement enables the compacting and space saving and improves the assembling workability. Furthermore, a seal portion is constructed of the seal lips 27 and 28 on both sides of a portion where the magnetized pulser ring 30 and the magnetic sensor 31 face each other. This arrangement can prevent water from entering inwardly of the magnetic sensor 31 and prevent the lubricant from leaking out of the bearing.

Figure 3:
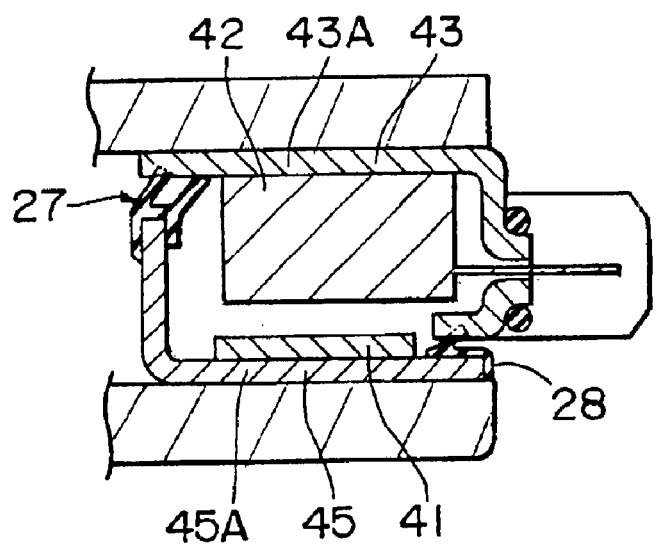
FIG. 3 is a sectional view of a modification example of the second embodiment.

In the second embodiment, the magnetized pulser ring 30 and the magnetic sensor 31 are made to face each other in the axial direction. However, as shown in FIG. 3, it is acceptable to fix a magnetic sensor 42 to the inner peripheral surface of a cylindrical portion 43A elongated in the axial direction of a stationary side member 43, fix a magnetized pulser ring 41 to the outer peripheral surface of a cylindrical portion 45A elongated in the axial direction of a rotating side member 45 and make the magnetized pulser ring 41 and the magnetic sensor 42 face each other in the radial direction. Although the magnetized pulser ring is made to face the very front of the magnetic sensor in the second embodiment and the embodiments described below, the magnetized pulser ring and the magnetic sensor may be made to obliquely face each other. There may be an arrangement such that the magnetized pulser ring and the magnetic sensor are relatively displaced from the face-to-face positions to the mutually displaced positions along the plane of opposition. It was confirmed that the magnetic sensor was able to detect a magnetic change due to the rotation of the magnetized pulser ring even in the obliquely displaced positions or the mutually displaced positions as described above.

<Third Embodiment>

Figure 4:
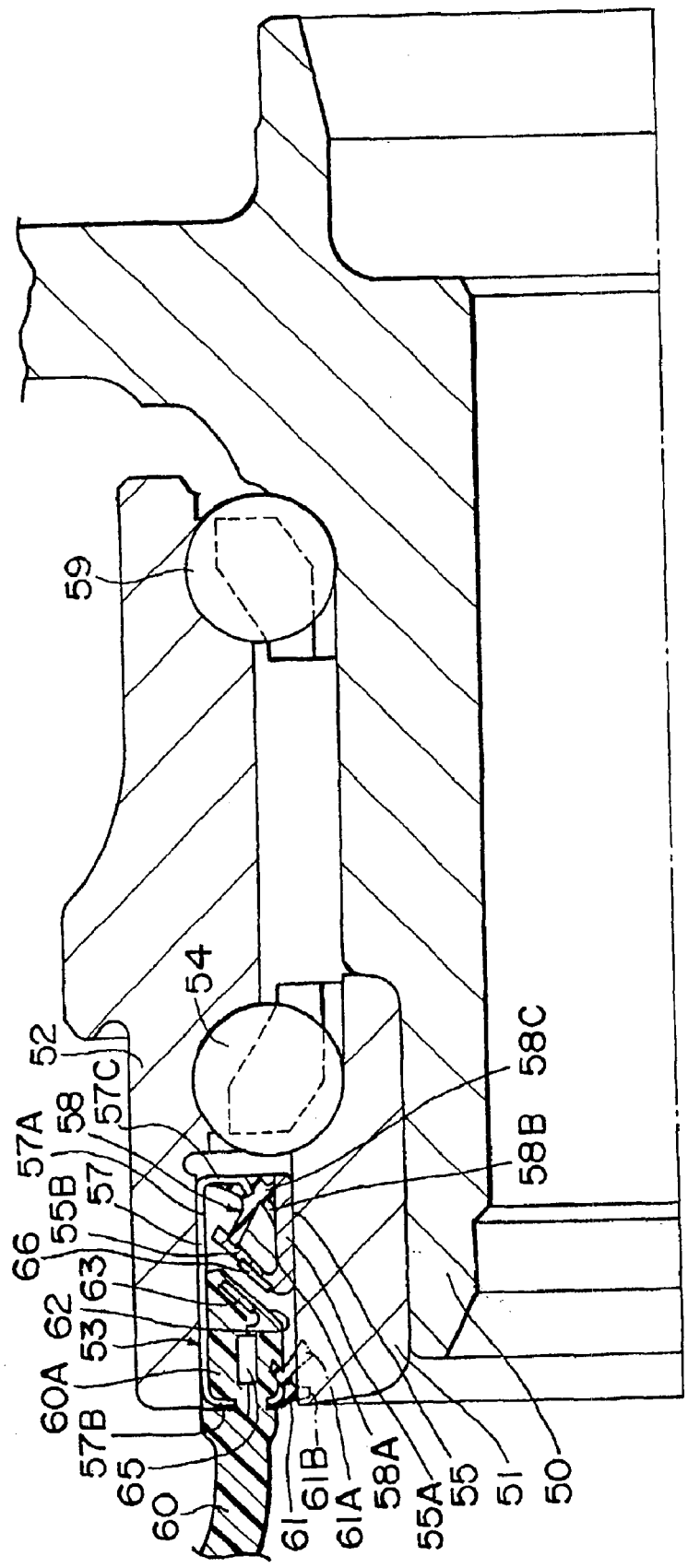
FIG. 4 is a sectional view of a wheel speed detector according to a third embodiment of the present invention.

Next, FIG. 4 shows the wheel speed detector of the third embodiment of the present invention. The present third embodiment is integrated with the inside of a seal device 53 arranged between an inner wheel 51 and an outer wheel 52. The inner wheel 51 is mounted around an inner cylinder 50. Then, balls 54 are arranged between the inner wheel 51 and the outer wheel 52, while balls 59 are arranged between the inner cylinder 50 and the outer wheel 52.

The seal device 53 is provided with a rotating side annular member 55 fixed to the outer peripheral surface of the inner wheel 51 located on the rotating side and a stationary side annular member 57 fixed to the inner peripheral surface of the outer wheel 52 located on the stationary side. The rotating side annular member 55 has a sectionally roughly V-figured shape and includes an axial cylindrical portion 55A and an inclined flange 55B. The stationary side annular member 57 has an axial cylindrical portion 57A and inner flanges 57B and 57C located on both ends of the axial cylindrical portion 57A. A seal lip 58 is fixed to this inner flange 57C, and this seal lip 58 has an axial lip 58A brought in sliding contact with the inner peripheral surface of the inclined flange 55B of the rotating side annular member 55, a main lip 58B brought in sliding contact with the axial cylindrical portion 55A of the rotating side annular member 55 and an auxiliary lip 58C.

A base portion 60A of a wire harness 60 is fixed from the inner flange 57B of the stationary side annular member 57 to the axial cylindrical portion 57A. In this base portion 60A is a resin-molded outer seal lip 61 whose main lip 61A and auxiliary lip 61B are brought in sliding contact with the outer peripheral surface of the inner wheel 51. This base portion 60A has an inclined surface 62 that faces the inclined flange 55B of the rotating side annular member 55 at a specified interval, and a magnetic sensor 63 is buried in this inclined surface 62. This magnetic sensor 63 is constructed of a semiconductor circuit and is connected to a signal processing circuit 65. A magnetized pulser ring 66 that faces this magnetic sensor 63 and serves as a magnetic ring is fixed to the inclined flange 55B. This magnetized pulser ring 66 uses a material obtained by mixing magnetic powder with a rubber or resin and magnetized so that a north pole and a south pole are alternately arranged in the circumferential direction.

The wheel speed detector constructed of the magnetic sensor 63 and the magnetized pulser ring 66 is integrated with the inside of the seal device 53, and therefore, the detector is compact and has good assembling workability. The magnetic sensor 63 and the magnetized pulser ring 66 face each other obliquely with respect to the relative axis of rotation of the inner wheel 51 and the outer wheel 52, and therefore, the radial dimensions can be reduced, allowing the compacting to be promoted.

<Fourth Embodiment>

Figure 5:
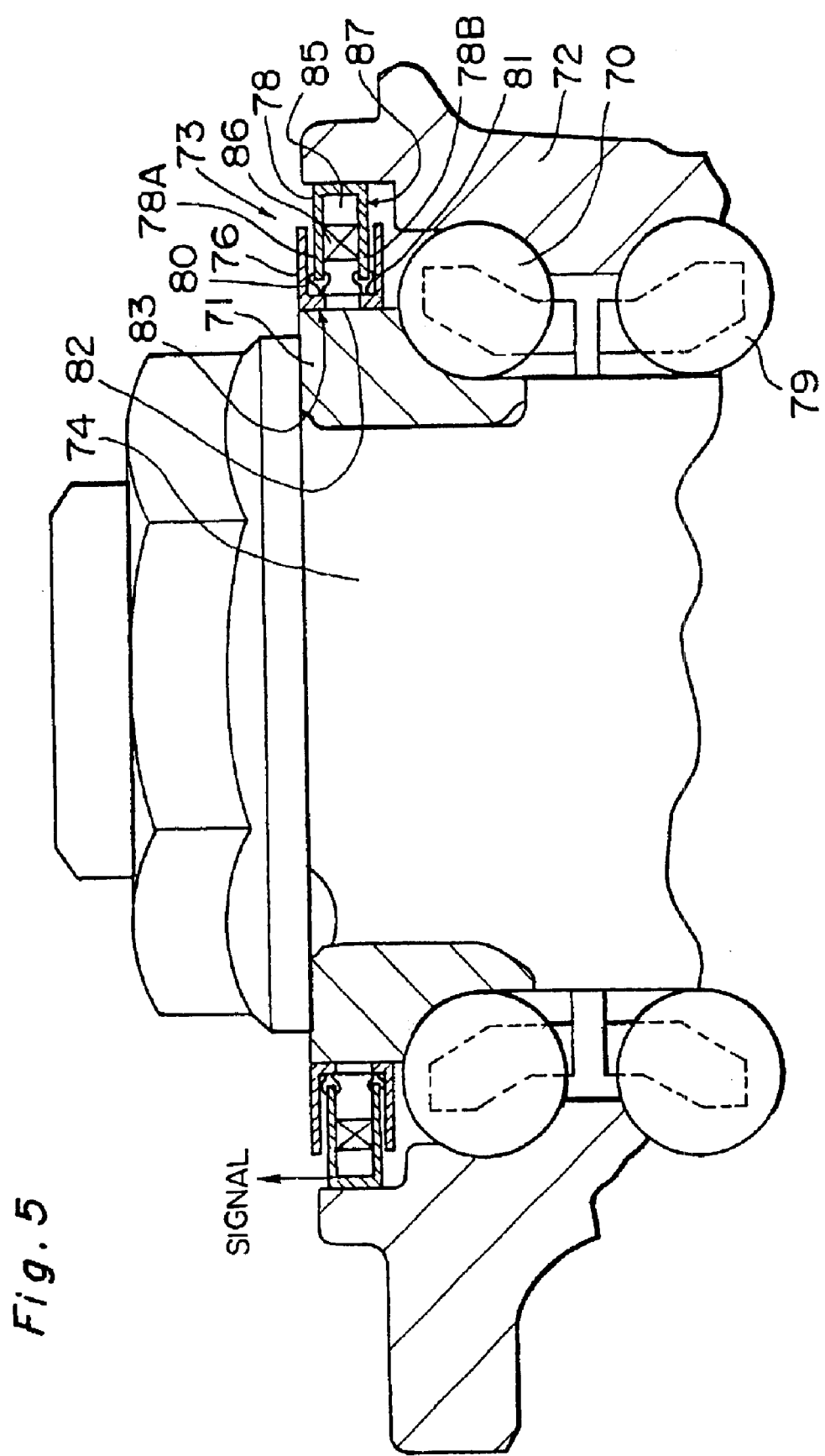
FIG. 5 is a sectional view of a wheel speed detector according to a fourth embodiment of the present invention.

Next, FIG. 5 shows the wheel speed detector of the fourth embodiment of the present invention. This fourth embodiment is integrated with a seal device 73 arranged between an inner wheel 71 and an outer wheel 72. It is to be noted that the inner wheel 71 is mounted around a shaft 74. Balls 79 are arranged in a space between this shaft 74 and the outer wheel 72, while balls 70 are arranged in a space between the inner wheel 71 and the outer wheel 72.

This seal device 73 is constructed of a sectionally bracket-shaped rotating side annular member 76 fixed to the outer peripheral surface of the inner wheel 71 and a sectionally bracket-shaped stationary side annular member 78 fixed to the inner peripheral surface of the outer wheel 72. This stationary side annular member 78 is put inside the rotating side annular member 76 with interposition of a specified gap. Seal lips 80 and 81 are fixed to the radial inner ends 78A and 78B of the stationary side annular member 78, and the seal lips 80 and 81 are brought in sliding contact with the cylindrical peripheral surface and the disk-shaped peripheral surface, respectively, of the rotating side annular member 76.

A plurality of windows 82 are formed at specified intervals in the circumferential direction in the cylindrical portion of the rotating side annular member 76, forming a magnetic ring 83. A magnet 85 and a coil 86 are fixed to the inside of the stationary side annular member 78, forming a magnetic sensor 87. This stationary side annular member 78 is made of a magnetic material and plays the role of a yoke (magnetic path) of the magnetic sensor 87.

The wheel speed detector of the present fourth embodiment, in which the magnetic ring 83 is constructed of the rotating side annular member 76 of the seal device 73 and the stationary side annular member 78 of the seal device 73 concurrently serves as the yoke (magnetic path) of the magnetic sensor 87, can be reduced in the number of components, allowing the compacting to be further promoted.

<Fifth Embodiment>

Figure 6:
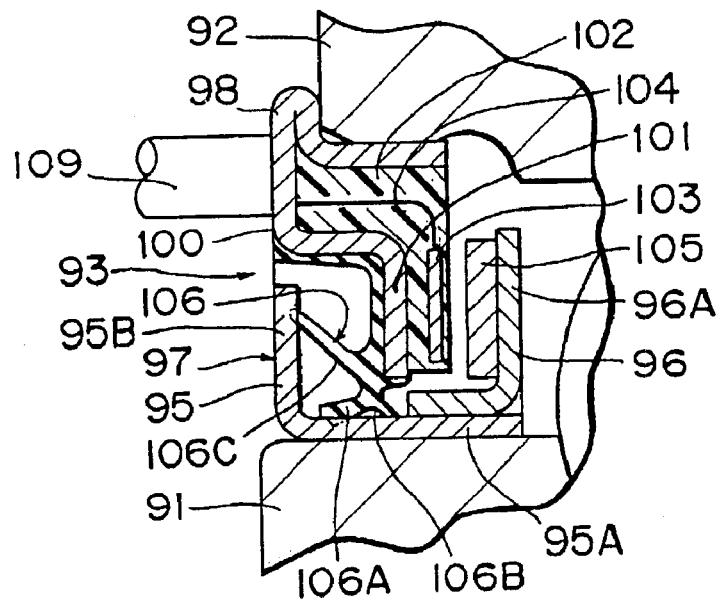
FIG. 6 is a sectional view of a wheel speed detector according to a fifth embodiment of the present invention.
Figure 7:
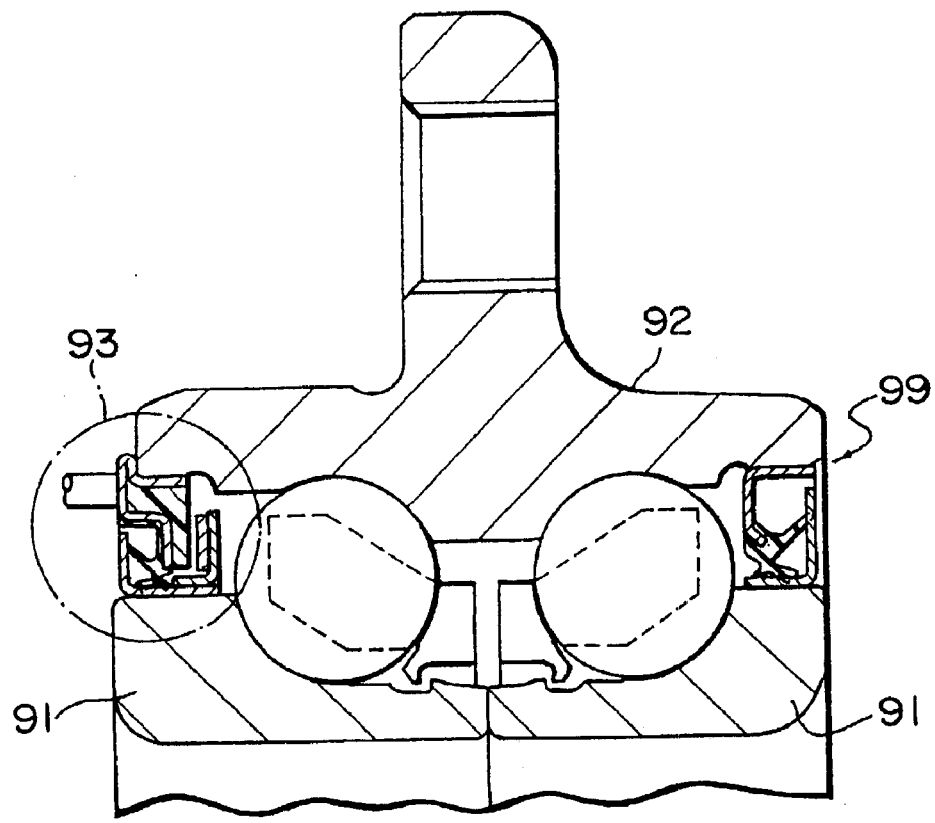
FIG. 7 is a sectional view showing the structure around the wheel speed detector of the fifth embodiment.

Next, FIG. 6 shows the wheel speed detector of the fifth embodiment of the present invention. The present fifth embodiment is integrated with a seal device 93 arranged between an inner wheel 91 and an outer wheel 92. It is to be noted that the inner wheel 91 is arranged adjacently in two lines in the axial direction as shown in FIG. 7 where balls 94 are arranged between the inner wheel 91 and the outer wheel 92. A seal device 99 having a structure similar to that of the seal device 93 is arranged axially on the opposite side of the seal device 93.

The seal device 93 is provided with a sectionally L-figured annular slinger 95 fixed to the outer peripheral surface of the inner wheel 91 and another sectionally L-figured annular slinger 96 fixed to the axial inside portion 95A of this slinger 95. These two slingers 95 and 96 constitute a rotating side member 97. The seal device 93 has an annular core bar 98 that serves as a stationary side member fixed to the inner peripheral surface of the outer wheel 92. This annular core bar 98 is constructed of a bent portion 100 that is projecting outwardly in the axial direction and a projecting portion 101 that is projecting inwardly in the radial direction. A resin portion 102 that fills the inside of this bent portion 100 and forms a resin portion 102 along the projecting portion 101, and a magnetic sensor 103 is molded in this resin portion 102. A signal line 104 is connected to this magnetic sensor 103, and this signal line 104 is connected to a harness 109 fixed to the outer peripheral surface of the bent portion 100 of the core bar 98.

Then, a magnetic ring 105 is fixed to a radial portion 96A of the slinger 96 so as to face this magnetic sensor 103. On the other hand, a seal lip 106 is fixed to the projecting portion 101 of the core bar 98. This seal lip 106 has a main lip 106A and an auxiliary lip 106B located axially inside this main lip 106A. This main lip 106A and the auxiliary lip 106B are brought in sliding contact with the axial portion 95A of the slinger 95.

Further, the seal lip 106 is provided with an axial lip 106C that extends obliquely in the axial direction radially outwardly of the main lip 106A. This axial lip 106C obliquely extends outwardly in the axial direction and outwardly in the radial direction and is brought in sliding contact with a radial portion 95B of the slinger 95.

In the wheel speed detector of the present fifth embodiment, the magnetic ring 105 and the magnetic sensor 103 are integrated with the inside of the seal device 93. This arrangement enables the compacting and space saving and improves the assembling workability. Furthermore, the waterproof performance can be improved since the slingers 95 and 96 and the core bar 98 constitute the labyrinth structure and the seal lip 106 extending from the core bar 98 is brought in sliding contact with the slinger 95 by the three lips of the main lip 106A, the auxiliary lip 106B and the axial lip 106C.

<Sixth Embodiment>

Figure 8:
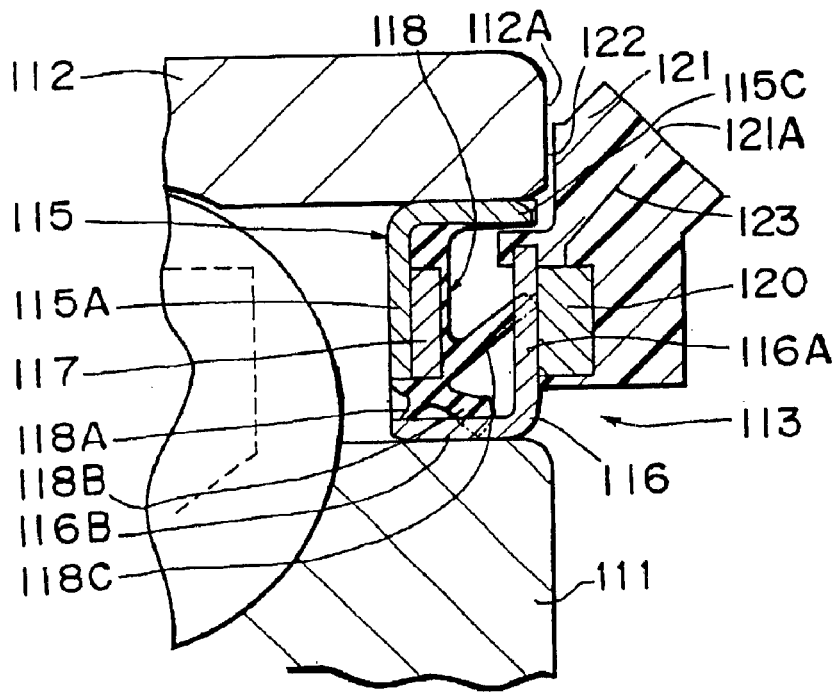
FIG. 8 is a sectional view of a wheel speed detector according to a sixth embodiment of the present invention.

Next, FIG. 8 shows the wheel speed detector of the sixth embodiment of the present invention. The present sixth embodiment is integrated with a seal device 113 arranged between an inner wheel 111 and an outer wheel 112. This seal device 113 is provided with a sectionally roughly inverted L-figured core bar 115 fixed to the inner peripheral surface of the outer wheel 112 located on the rotating side and a sectionally roughly L-figured slinger 116 fixed to the inner wheel 111 located on the stationary side. The core bar 115 and the slinger 116 have oppositional portions 115A and 116A that face each other in the axial direction. A magnetized pulser ring 117 that serves as a magnetic ring is fixed to the oppositional portion 115A of this core bar 115. A seal lip 118 constructed of a nonmagnetic elastic member is fixed to the oppositional portion 115A of this core bar 115 so as to cover the magnetized pulser ring 117. This seal lip 118 is provided with an auxiliary lip 118A, a main lip 118B and an axial lip 118C. The auxiliary lip 118A and the main lip 118B are brought in sliding contact with a cylindrical portion 116B of the slinger 116, and the axial lip 118C is brought in sliding contact with the oppositional portion 116A of the slinger 116. This axial lip 118C extends outwardly in the axial direction and outwardly in the radial direction from the root portion to the leading end portion.

On the other hand, a magnetic sensor 120 is fixed to the outer surface of the oppositional portion 116A of the slinger 116. This magnetic sensor 120 is covered with a resin mold that constitutes a mold portion 121. This mold portion 121 forms a labyrinth 122 oppositional to an axial end surface 115C of the core bar 115 and an axial end surface 112A of the outer wheel 112. The mold portion 121 has an inclined surface 121A that inclines relative to a plane perpendicular to the axis of the rotary shaft, and this inclined surface 121A serves as a surface for leading a signal line 123 from the magnetic sensor 120. This inclined surface 121A is upslope from the outside toward the inside in the axial direction.

In the present sixth embodiment, the magnetized pulser ring 117 is covered with the seal lip 118 constructed of the nonmagnetic elastic member, and accordingly, there is formed no such bridge that might connect the south pole with the adjacent north pole due to the adhesion of iron powder or the like to the magnetized pulser ring 117. Therefore, the magnetic noise can be reduced and the rotating speed detection accuracy can be improved. Further, in this sixth embodiment, a labyrinth 122 is formed of a mold portion 121 in addition to the three lips 118A, 118B and 118C owned by the seal lip 118, and therefore, the waterproof performance can be improved. Further, in the present sixth embodiment, the slinger 116 for fixing the magnetic sensor 120 is made nonmagnetic with a material of austenite-based stainless steel, and therefore, the magnetic detection accuracy of the magnetic sensor 120 can be improved. Further, in the present sixth embodiment, a signal line 123 can be led out of the inclined surface 121A owned by the mold portion 121.

<Seventh Embodiment>

Figure 9:
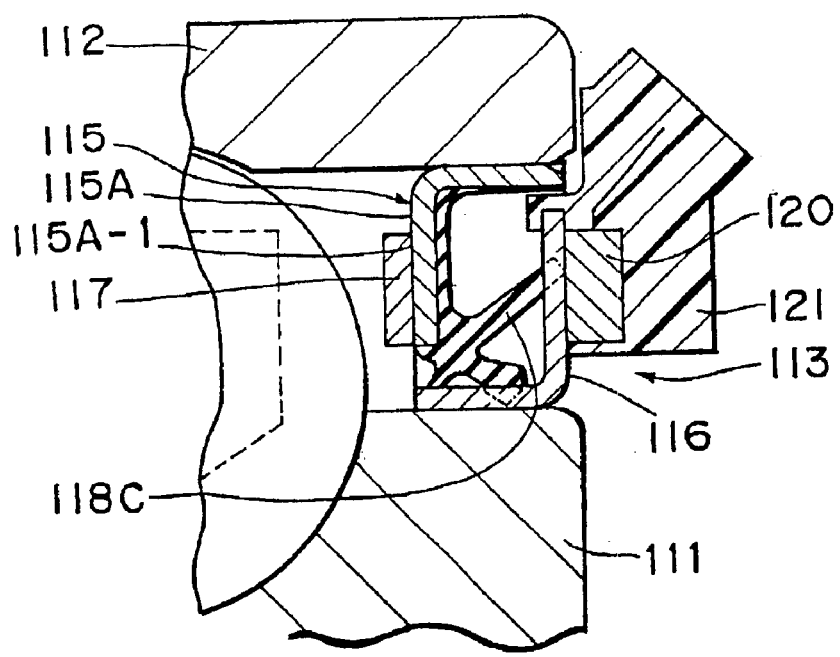
FIG. 9 is a sectional view of a wheel speed detector according to a seventh embodiment of the present invention.

Next, FIG. 9 shows the wheel speed detector of the seventh embodiment of the present invention. The present seventh embodiment differs from the sixth embodiment shown in FIG. 8 in that the magnetized pulser ring 117 is fixed to an inner surface 115A-1 of the oppositional portion 115A of the core bar 115. In the present sixth embodiment, the magnetized pulser ring 117 is fixed to the inner surface 11SA-1 of the oppositional portion 115A of the core bar 115. With this arrangement, the pulser ring 117 that is made of a material obtained by mixing magnetic powder with a rubber or resin and put in a non-magnetized state can be magnetized axially from inside. Therefore, the axial lip 118C does not become an obstacle during the magnetization.

In the present seventh embodiment, the core bar 115 is made of a magnetic material, and therefore, the magnetic force of the pulser ring 117 can be increased.

<Eighth Embodiment>

Figure 10:
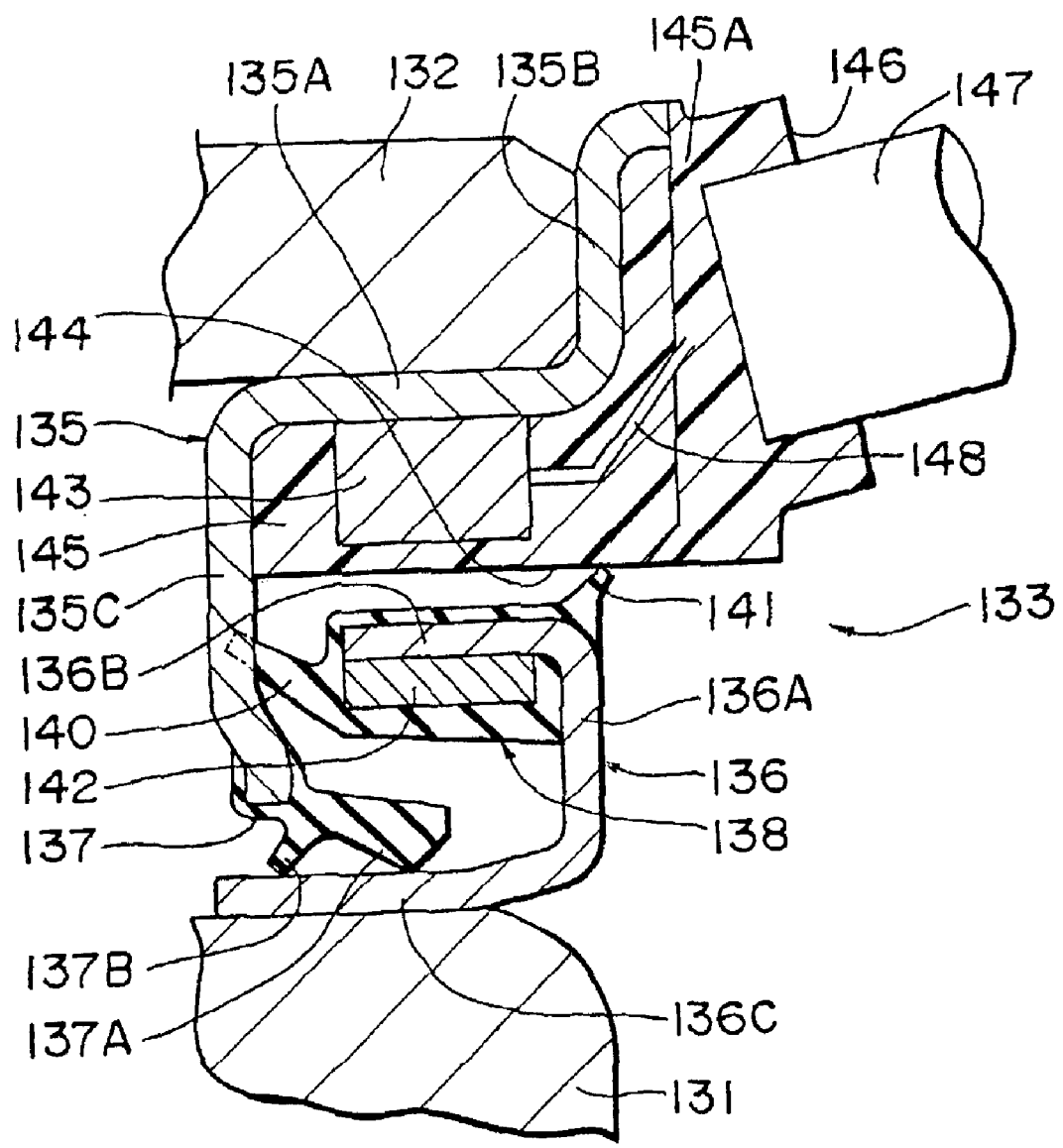
FIG. 10 is a sectional view of a wheel speed detector according to an eighth embodiment of the present invention.

Next, FIG. 10 shows the wheel speed detector of the eighth embodiment of the present invention. The present eighth embodiment is integrated with a seal device 133 arranged between an inner wheel 131 and an outer wheel 132. This seal device 133 is provided with a core bar 135 that serves as a stationary side member and is fixed to the inner peripheral surface of the outer wheel 132 located on the stationary side and a slinger 136 that serves as a rotating side member and is fixed to the outer peripheral surface of the inner wheel 131 located on the rotating side.

The core bar 135 is provided with a cylindrical portion 135A, an outer flange 135B and an inner flange 135C that extend in the radial direction from both axial ends of this cylindrical portion 135A. A seal lip 137 having a main lip 137A and a first auxiliary lip 137B is fixed to the leading end of this inner flange 135C. On the other hand, the slinger 136 is constructed of a disk portion 136A and an outer cylindrical portion 136B and an inner cylindrical portion 136C that extend axially inwardly from both radial ends of this disk portion 136A. The main lip 137A and the first auxiliary lip 137B of the seal lip 137 are brought in sliding contact with the inner cylindrical portion 136C of this slinger 136. A seal lip 138 is fixed to the outer cylindrical portion 136B of the slinger 136. This seal lip 138 has an axial lip 140 brought in sliding contact with the inner flange 135C of the core bar 135 and a fourth lip 141 located axially outside this axial lip 140. This seal lip 138 covers a magnetized pulser ring 142 fixed to the inner surface of the outer cylindrical portion 136B of the slinger 136.

On the other hand, a magnetic sensor 143 is fixed to the cylindrical portion 135A of the core bar 135, and this magnetic sensor 143 is buried in a resin portion 145 that serves as a cover member. A fourth lip 141 of the seal lip 138 is brought in sliding contact with this resin portion 145. The resin portion 145 has an axial end portion 145A that closely fit to the outer flange 135B of the core bar 135, and this axial end portion 145A has an inclined surface 146 that is inclined relative to the axis of rotation. This inclined surface 146 is upslope from the outside toward the inside in the axial direction, and a harness 147 is projecting from this inclined surface 146. This harness 147 is connected to a signal line 148 extending from the magnetic sensor 143.

In the wheel speed detector of the present eighth embodiment, a magnetized pulser ring 142 and a magnetic sensor 143 face each other in the radial direction, and therefore, the axial dimensions can be reduced to enable the compacting in the axial dimension. Further, the present eighth embodiment is provided with a second auxiliary lip 141 located outside the axial lip 140 in addition to the main lip 137A, the auxiliary lip 137B and the axial lip 140, and therefore, the sealing performance can be improved. In particular, the second auxiliary lip 141 prevents muddy water from directly splashing on the axial lip 140, and therefore, an improved muddy water resistance can be achieved. Further, in the present eighth embodiment, the second auxiliary lip 141 is fixed to the slinger 136 fixed to the inner wheel 131 located on the rotating side, and therefore, a centrifugal force in the rotating stage presses the second auxiliary lip 141 against the core bar 135 (cylindrical inner peripheral surface 144 of the resin portion 145) located radially outside. Therefore, the sealing performance during rotation can be improved. In the present eighth embodiment, the harness 147 is projecting from the inclined surface 146 of the resin portion 145 that covers the magnetic sensor 143, and therefore, the harness outlet width can be widened. In the present eighth embodiment, the magnetized pulser ring 142 is completely covered with the seal lip 138 and placed inside the seal portion constructed of the seal lip 137 and the seal lip 138. This removes the concern about the adhesion of a magnetic foreign material to the magnetized pulser ring 142 and restrains the occurrence of noises, thereby allowing a correct speed detection to be achieved.

<Ninth Embodiment>

Figure 11:
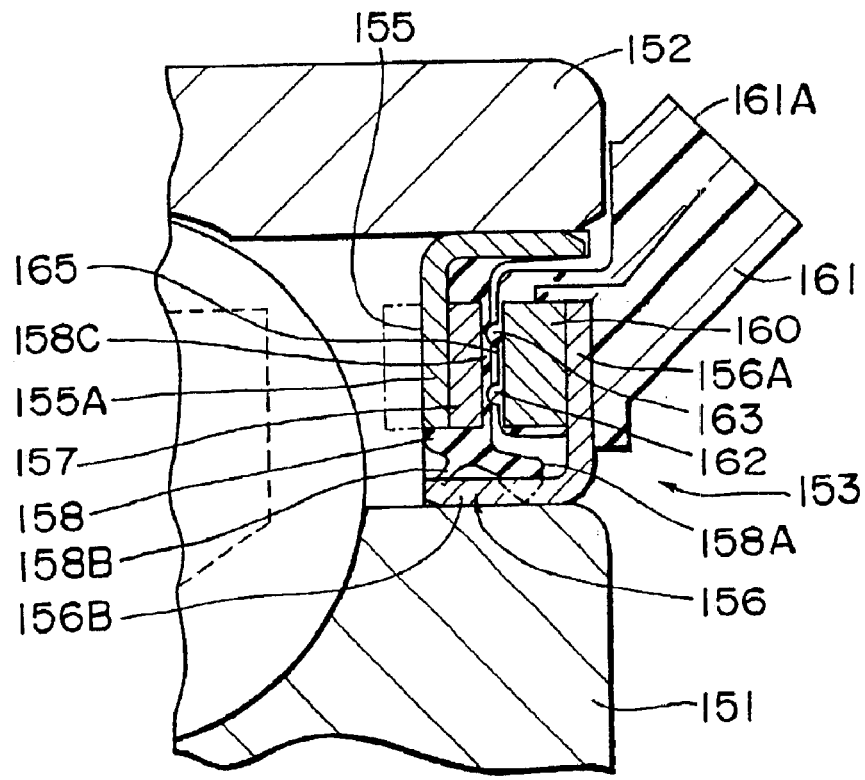
FIG. 11 is a sectional view of a wheel speed detector according to a ninth embodiment of the present invention.

Next, FIG. 11 shows the wheel speed detector of the ninth embodiment of the present invention. The present ninth embodiment is integrated with a seal device 153 arranged between an inner wheel 151 and an outer wheel 152. This seal device 153 is provided with a sectionally roughly inverted L-figured core bar 155 fixed to the inner peripheral surface of the outer wheel 152 located on the rotating side and a sectionally reversed L-figured slinger 156 fixed to the inner wheel 151 located on the stationary side. The core bar 155 and the slinger 156 have respective oppositional portions 155A and 156A that face each other in the axial direction. A magnetized pulser ring 157 that serves as a magnetic ring is fixed to the oppositional portion 155A of this core bar 155. A seal lip 158 constructed of a nonmagnetic elastic member is fixed to the oppositional portion 155A of this core bar 115 so as to cover the magnetized pulser ring 157. This seal lip 158 has a main lip 158A and an auxiliary lip 158B that are brought in sliding contact with a cylindrical portion 156B of the slinger 156.

On the other hand, a magnetic sensor 160 is fixed to the inner surface of the oppositional portion 156A of the slinger 156, and this magnetic sensor 160 is completely covered with a resin portion 161 in which the slinger 156 is molded. This resin portion 161 has an annular inner diameter side projection 162 and an annular outer diameter side projection 163 that are projecting axially inwardly from the front surface of the magnetic sensor 160 toward the magnetized pulser ring 157. The projection 162 and the projection 163 constitute a labyrinth 165 between the projections and a thin portion 158C of the seal lip 158 that covers the magnetized pulser ring 157.

According to the present ninth embodiment, the resin portion 161 that covers the magnetic sensor 160 fixed to the slinger 156 has ring-shaped projections 162 and 163, and these ring-shaped projections 162 and 163 form the labyrinth 165 in a path that extends in the radial direction between the core bar 155 and the slinger 156. This obviates the need for forming the axial lip for radially sealing the path on the core bar 155. Therefore, the axial lip does not become an obstacle in magnetizing the magnetic pulser ring 157 to be fixed to the oppositional portion (radial portion) 155A of the core bar 155, allowing the manufacturing to be facilitated.

The point that this resin portion 161 can widen the harness outlet width by virtue of the inclined surface 161A located at the axial end is similar to those of the aforementioned sixth and seventh embodiments shown in FIG. 8 and FIG. 9.

In the aforementioned embodiment, the magnetized pulser ring 157 is fixed to the axial outer surface of the oppositional portion 155A of the core bar 155. However, as indicated by the one-dot chain lines, the magnetized pulser ring 157 may be fixed to the axial inner surface of the oppositional portion 155A.

<Tenth Embodiment>

Figure 12:
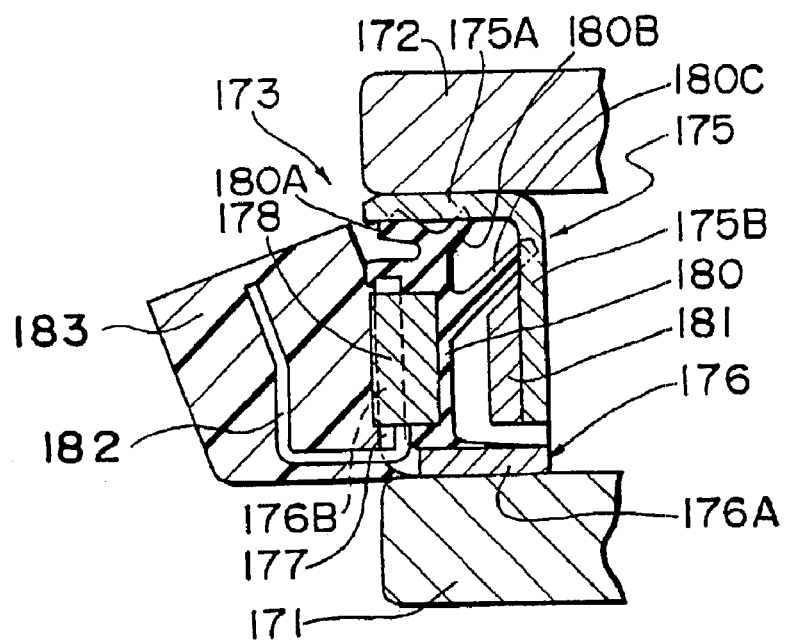
FIG. 12 is a sectional view of a wheel speed detector according to a tenth embodiment of the present invention.

Next, FIG. 12 shows the wheel speed detector of the tenth embodiment of the present invention. The present tenth embodiment is integrated with a seal device 173 arranged between an inner wheel 171 and an outer wheel 172. This seal device 173 is provided with a sectionally inverted L-figured slinger 175 that serves as a rotating side member fixed to the inner peripheral surface of the outer wheel 172 located on the rotating side and a sectionally L-figured core bar 176 that serves as a stationary side member fixed to the outer peripheral surface of the inner wheel 171 located on the stationary side.

The sectionally L-figured core bar 176 is provided with a cylindrical portion 176A and a flange portion 176B that radially extends from the axial outer end of this cylindrical portion 176A. This flange portion 176B has an axial through hole 177, and a magnetic sensor 178 is fit in this axial through hole 177. Then, a seal lip 180 is fixed to the core bar 176 so as to cover this magnetic sensor 178. This seal lip 180 is provided with a main lip 180A, an auxiliary lip 180B and an axial lip 180C. This axial lip 180C obliquely extends inwardly in the axial direction and outwardly in the radial direction from the root portion toward the leading end. The main lip 180A and the auxiliary lip 180B are brought in sliding contact with a cylindrical portion 175A of the sectionally inverted L-figured slinger 175, while the axial lip 180C is brought in sliding contact with a flange portion 175B of the sectionally inverted L-figured slinger 175.

A magnetized pulser ring 181 that serves as a magnetic ring is fixed to the axial outer surface of the flange portion 175B of the sectionally inverted L-figured slinger 175 so as to face the magnetic sensor 178.

The magnetized pulser ring 181 and the magnetic sensor 178 constitute the wheel speed detector of the present tenth embodiment. A signal line 182 is connected to the radial inner end surface of this magnetic sensor 178, and this signal line 182 is buried in a resin portion 183 fixed to the end surface of the core bar 176 and extends outwardly in the axial direction and outwardly in the radial direction.

In the present tenth embodiment, part of the magnetic sensor 178 is arranged inside the axial through hole 177 formed through the core bar 176. This arrangement can promote the space saving and provides excellent mountability in the case of a small space. In the present tenth embodiment, all the seal lips (main lip 180A, auxiliary lip 180B and axial lip 180C) are fixed to the core bar 176 to which the magnetic sensor 178 is fixed, and therefore, the structure becomes simple.

<Eleventh Embodiment>

Figure 13:
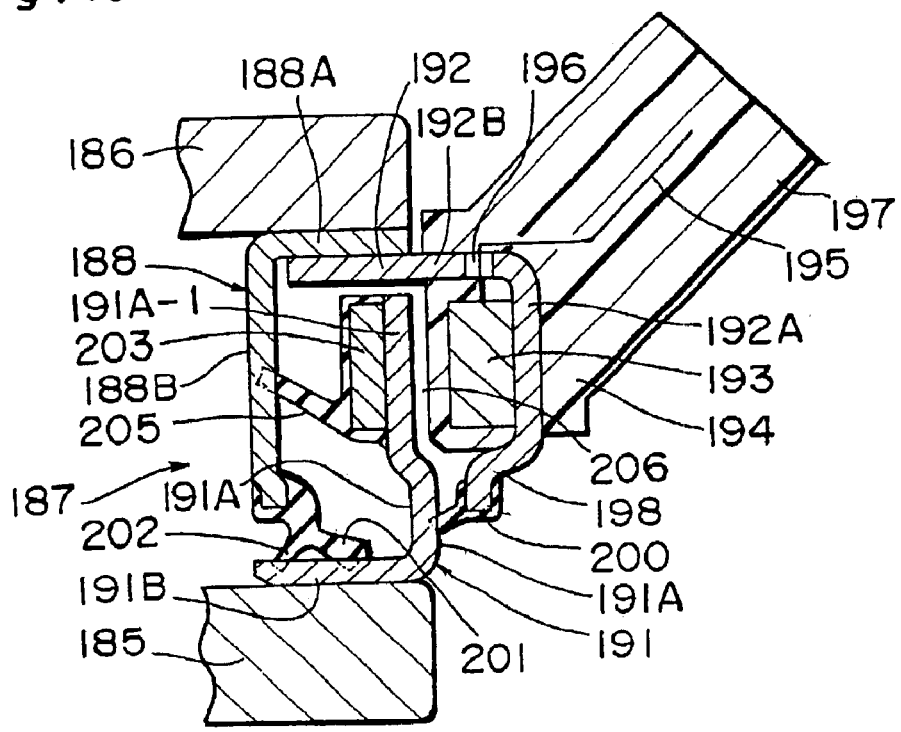
FIG. 13 is a sectional view of a wheel speed detector according to an eleventh embodiment of the present invention.

Next, FIG. 13 shows the wheel speed detector of the eleventh embodiment of the present invention. The present eleventh embodiment is constructed of a magnetic sensor 193 and a magnetized pulser ring 203 and integrated with the inside of a seal device 187 arranged between an inner wheel 185 and an outer wheel 186. This seal device 187 is provided with a sectionally inverted L-figured core bar 188 fixed to the inner peripheral surface of the outer wheel 186 located on the stationary side and a sectionally reversed L-figured slinger 191 fixed to the outer peripheral surface of the inner wheel 185 located on the rotating side. The seal device 187 is further provided with an inverted L-figured metal fitting 192 fixed in an overlapping manner to a cylindrical portion 188A of the core bar 188. A magnetic sensor 193 is fixed to the inner surface of an axial end radial portion 192A of this inverted L-figured metal fitting 192, and this magnetic sensor 193 is covered with a resin 194. A signal line 195 extending from this magnetic sensor 193 extends obliquely outwardly inside a resin portion 197 through a hole 196 formed through a cylindrical portion 192B of the inverted L-figured metal fitting 192. This resin portion 197 is fixed to the L-figured metal fitting 192 and extends obliquely outwardly.

A second auxiliary lip 200 is fixed to an inner end 198 bent inwardly of the radial portion 192A of this inverted L-figured metal fitting 192. This second auxiliary lip 200 is externally brought in sliding contact with a flange portion 191A of the slinger 191.

On the other hand, a main lip 201 and a first auxiliary lip 202 are fixed to the inner end of an inner flange 188b of the core bar 188, and this main lip 201 and the first auxiliary lip 202 are brought in sliding contact with a cylindrical portion 191B of the slinger 191. A leading end portion 191A-1 of the flange portion 191A of this slinger 191 is bent inward, and a magnetized pulser ring 203 that serves as a magnetic ring is fixed to the inner surface of this leading end portion 191A-1. An axial lip 205 constructed of a nonmagnetic elastic member is fixed to the magnetized pulser ring 203 so as to cover the magnetized pulser ring 203, and this axial lip 205 is brought in sliding contact with the inner flange 188B of the core bar 188.

The wheel speed detector of the present eleventh embodiment is protected from an external impact such as a kicked stone by the inverted L-figured metal fitting 192. Both the magnetic sensor 193 and the magnetized pulser ring 203 are covered with the resin 194 constructed of a nonmagnetic member and the axial lip 205 so as to be protected from moisture and dust. The inverted L-figured metal fitting 192 and the slinger 191 constitute a labyrinth 206, and a sealing performance is improved by the existence of the added second auxiliary lip 200 provided for the inverted L-figured metal fitting 192.

<Twelfth Embodiment>

Figure 14:
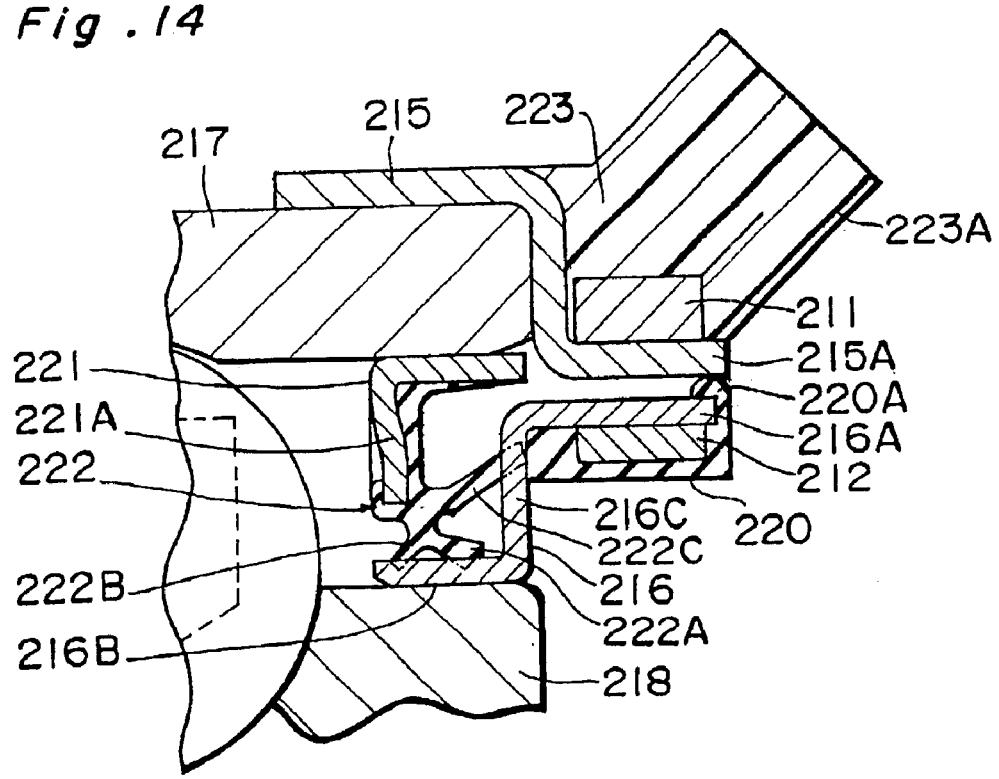
FIG. 14 is a sectional view of a wheel speed detector according to a twelfth embodiment of the present invention.

Next, FIG. 14 shows the wheel speed detector of the twelfth embodiment of the present invention. The present twelfth embodiment is constructed of a magnetic sensor 211 fixed to a sectionally step-shaped stationary side member 215 and a magnetized pulser ring 212 fixed to a sectionally step-shaped rotating side member 216.

The stationary side member 215 is fixed to the outer peripheral surface of an outer wheel 217, bent inward along the end surface and then extended in the axial direction. The rotating side member 216 is fixed to the outer peripheral surface of an inner wheel 218, bent radially outwardly and extended in the axial direction so as to face the stationary side member 215 with interposition of a specified gap. The stationary side member 215 and the rotating side member 216 face each other in the respective oppositional portions 215A and 216A. A magnetic sensor 211 is fixed to the outer peripheral surface of this oppositional portion 215A, and a magnetized pulser ring 212 is fixed to the inner peripheral surface of the oppositional portion 216A.

The magnetic sensor 211 is completely covered with a resin portion 223 fixed to the stationary side member 215. This resin portion 223 has a connecting portion 223A that is projecting obliquely in the axial direction.

The magnetized pulser ring 212 is covered with a cover 220 constructed of a nonmagnetic elastic member, and this cover 220 has a seal lip 220A brought in sliding contact with the oppositional portion 215A of the stationary side member 215. A core bar 221 is fixed to the inner peripheral surface of the outer wheel 217, and a seal lip 222 is fixed to a flange 221A of this core bar 221. This seal lip 222 has a main lip 222A, a first auxiliary lip 222B and an axial lip 222C. The main lip 222A and the first auxiliary lip 222B are brought in sliding contact with a cylindrical portion 216B of the rotating side member 216. The axial lip 222C is brought in sliding contact with a flange portion 216C of the rotating side member 216.

The wheel speed detector of the present twelfth embodiment is constructed of the magnetic sensor 211 and the pulser ring 212 and is integrated with a seal device constructed of the stationary side member 215, rotating side member 216, core bar 221 and seal lips 222 and 220A. This arrangement can simplify the overall structure and reduce the number of components. The magnetic sensor 211 and the pulser ring 212 are completely covered with the resin portion 223 and the cover 220, and therefore, the external influence of a foreign material can be avoided. The mixture of a foreign material into the sensor portion can be prevented by the second auxiliary lip 220A.

<Thirteenth Embodiment>

Figure 15:
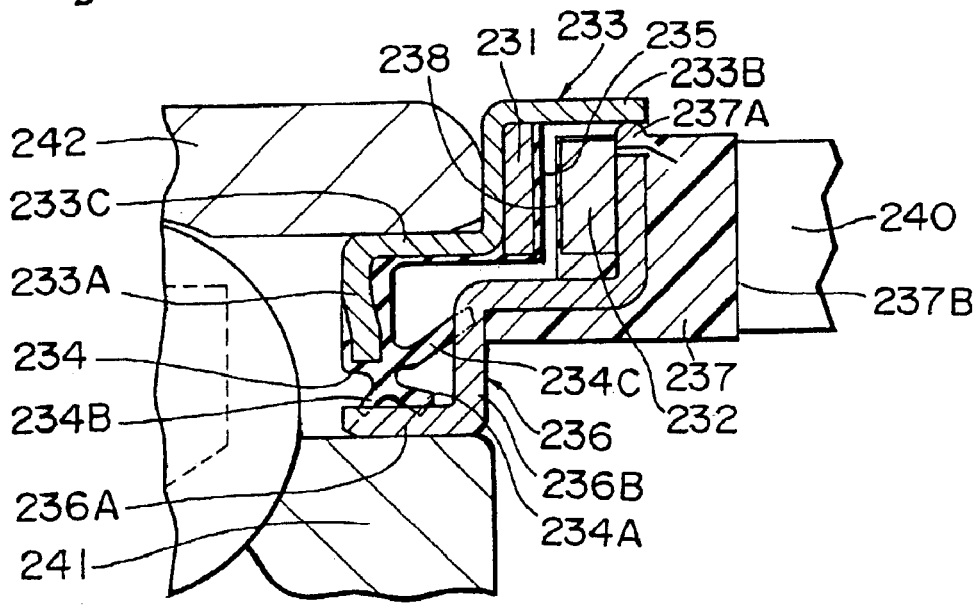
FIG. 15 is a sectional view of a wheel speed detector according to a thirteenth embodiment of the present invention.

Next, FIG. 15 shows the wheel speed detector of the thirteenth embodiment of the present invention. The present thirteenth embodiment is constructed of a magnetized pulser ring 231 and a magnetic sensor 232 that face each other in the axial direction. The magnetized pulser ring 231 is fixed to a core bar 233 and covered with a thin film 235 constructed of a nonmagnetic elastic member continued from a seal lip 234. The magnetic sensor 232 is fixed to a slinger 236 and is covered with a nonmagnetic thin film 238 continued from a resin portion 237.

The core bar 233 has a disk portion 233A that extends radially inwardly at the axial inner end, and a seal lip 234 is fixed to this disk portion 233A. This seal lip 234 has the three lips of a main lip 234A, an auxiliary lip 234B and an axial lip 234C. The main lip 234A and the auxiliary lip 234B are brought in sliding contact with a cylindrical portion 236A of the slinger 236, while the axial lip 234C is brought in sliding contact with a flange portion 236B of the slinger 236.

On the other hand, a resin portion 237 fixed to the slinger 236 has an annular projection 237A that faces the inner peripheral surface of an outer peripheral wall 233B of the core bar 233, and this annular projection 237A forms a labyrinth between the annular projection 237A and the outer peripheral wall 233B. Further, a harness 240 is projecting from an axial end surface 237B of the resin portion 237.

Then, a cylindrical portion 236A of the slinger 236 is fixed to an inner wheel 241, and a cylindrical portion 233C of the core bar 233 is fixed to an outer wheel 242.

The core bar 233, the slinger 236, the seal lip 234 and the annular projection 237A of the resin portion 237 constitute a seal device.

In the wheel speed detector of the present thirteenth embodiment, the magnetized pulser ring 231 and the magnetic sensor 232 are integrated with the inside of the seal device. This enables the compacting and space saving and improves the assembling workability.

Further, the annular projection 237A fixed to the slinger 236 and the outer peripheral wall 233B of the core bar 233 constitute the labyrinth structure. This arrangement can prevent the external foreign material from entering the portion where the magnetic sensor 232 and the pulser ring 231 face each other and avoid the influence of the foreign material on the signal. The pulser ring 231 is covered with the thin film 235 made of a nonmagnetic elastic member, and the magnetic sensor 232 is covered with the nonmagnetic thin film 238 connected to the resin portion 237. Therefore, the waterproof performance can be improved.

<Fourteenth Embodiment>

Figure 16:
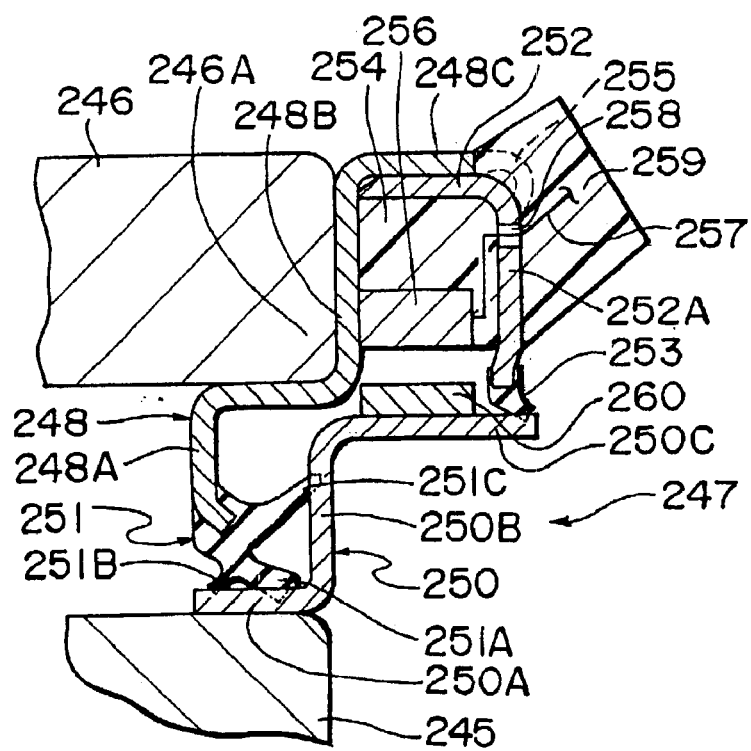
FIG. 16 is a sectional view of a wheel speed detector according to a fourteenth embodiment of the present invention.

Next, FIG. 16 shows the wheel speed detector of the fourteenth embodiment of the present invention. The present fourteenth embodiment is integrated with the inside of a seal device 247 for sealing a gap between a rotating side inner wheel 245 and a stationary side outer wheel 246.

This seal device 247 is provided with a core bar 248 fixed to the outer wheel 246 and a slinger 250 fixed to the inner wheel 245. A seal lip 251 is fixed to an inner diameter portion 248A of a core bar 248. This seal lip 251 is provided with a main lip 251A and a first auxiliary lip 251B brought in sliding contact with a cylindrical portion 250A of the slinger 250 and an axial lip 251C brought in sliding contact with a disk portion 250B of the slinger 250.

The core bar 248 is provided with a bent portion 248B that is bent along a corner 246A of the outer wheel 246 and an outer peripheral portion 248C that extends axially outwardly from a radial end of this bent portion 248B. A removable cover metal fitting 252 is mounted on the inside of the outer peripheral portion 248C of this core bar 248. A magnetic sensor 256 is fixed to a resin 254 filled inside this cover metal fitting 252. This cover metal fitting 252 is provided with a radial portion 252A bent radially inwardly from the outer peripheral portion 248C, and a second auxiliary lip 253 is fixed to an end of this radial portion 252A. This second auxiliary lip 253 is brought in sliding contact with an axial portion 250C of the slinger 250. This cover metal fitting 252 is fixed to the core bar 248 by a calking portion 255 formed in the outer peripheral portion 248C of the core bar 248. By releasing the calking of this calking portion 255, the cover metal fitting 252 can be removed from the core bar 248 by being slid in the axial direction. A hole 258 through which a signal line 257 extending from the magnetic sensor 256 extends is formed through this cover metal fitting 252. This signal line 257 is led obliquely outwardly in the axial direction and is buried in a resin portion 259 fixed to the radial portion 252A of the cover metal fitting 252.

A magnetized pulser ring 260 of the present fourteenth embodiment is fixed to an axial portion 250C of the slinger 250 and made to face the magnetic sensor 256. The wheel speed detector of the present fourteenth embodiment, in which the magnetic sensor 256 and the pulser ring 260 are integrated with the inside of the seal device 247, can be compacted, allowing the mounting work to be simplified. The magnetic sensor 256 is mounted on the removable cover metal fitting 252 according to this wheel speed detector, and therefore, the magnetic sensor 256 can be easily replaced. The second auxiliary lip 253 can prevent the foreign material from entering a portion where the pulser ring 260 and the magnetic sensor 256 face each other.

<Fifteenth Embodiment>

Figure 17:
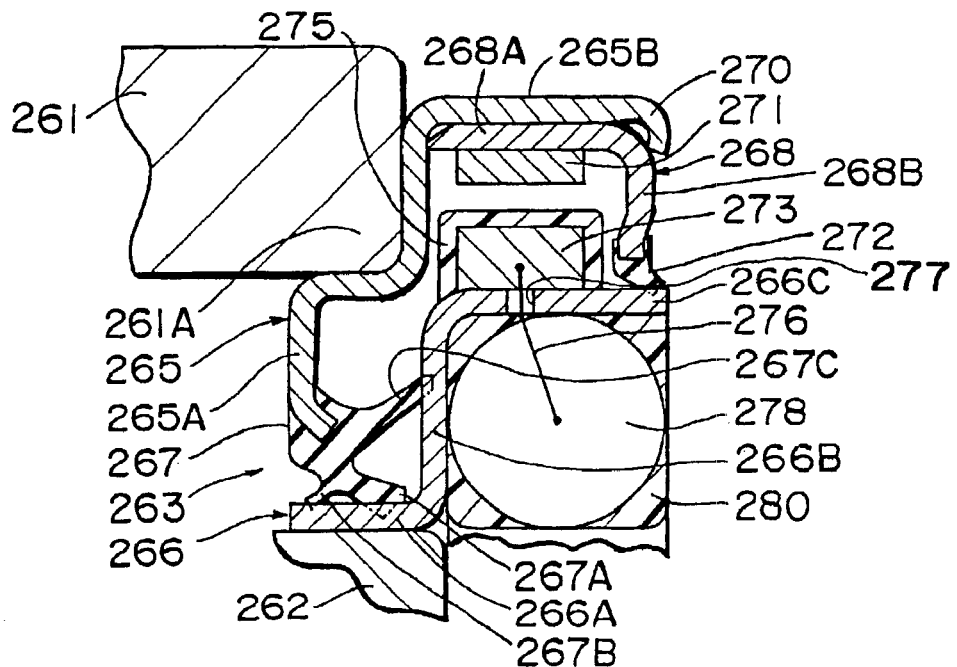
FIG. 17 is a sectional view of a wheel speed detector according to a fifteenth embodiment of the present invention.

Next, FIG. 17 shows the wheel speed detector of the fifteenth embodiment of the present invention. The present fifteenth embodiment is integrated with the inside of a seal device 263 for sealing a gap between a rotating side outer wheel 261 and a stationary side inner wheel 262.

This seal device 263 is provided with a core bar 265 fixed to a corner 261A located on the inner diameter side of the outer wheel 261 and a slinger 266 fixed to the inner peripheral surface of the inner wheel 262. A seal lip 267 is fixed to the inner end of an inner diameter portion 265A of the core bar 265. This seal lip 267 is provided with a main lip 267A, an auxiliary lip 267B and an axial lip 267C. The main lip 267A and the first auxiliary lip 267B are brought in sliding contact with an inside axial portion 266A of a slinger 266, while an axial lip 267C is brought in sliding contact with a disk portion 266B of the slinger 266.

The core bar 265 has an outside axial portion 265B, and a cover metal fitting 268 is fixed to the inner side of the outside axial portion 265B by a calking portion 270 of this outside axial portion 265B. This cover metal fitting 268 is constructed of an axial portion 268A and a radial portion 268B that is bent inward in the radial direction. A magnetized pulser ring 271 is fixed to the inside of this axial portion 268A, and a second auxiliary lip 272 is fixed to an end of the radial portion 268B. This second auxiliary lip 272 is brought in sliding contact with an axial end of an outer axial portion 266C of the slinger 266.

A magnetic sensor 273 is fixed to the outer axial portion 266C of this slinger 266 so as to face the magnetized pulser ring 271. This magnetic sensor 273 is covered with a resin layer 275, and a signal line 276 extending from the magnetic sensor 273 is led radially inwardly through a hole 277 formed through the outer axial portion 266C. This signal line 276 is connected to a harness 278 that extends in the circumferential direction, and this harness 278 is buried in a resin portion 280 fixed to the disk portion 266B and the outer axial portion 266C of the slinger 266.

The wheel speed detector of the present fifteenth embodiment, in which the harness 278 connected to the signal line 276 extending from the magnetic sensor 273 is buried in the resin portion 280 fixed to the disk portion 266B and the axial portion 266C of the slinger 266 and led in the circumferential direction, can assure the strength of the root portion of the harness 278. The cover metal fitting 268 is removably fixed to the core bar 265 by the calking portion 270 of the core bar 265. This arrangement can simplify the replacement of the magnetized pulser ring 271 fixed to the cover metal fitting 268. The second auxiliary lip 272 mounted on the cover metal fitting 268 can prevent the foreign material from entering the sensor portion.

<Sixteenth Embodiment>

Figure 18:
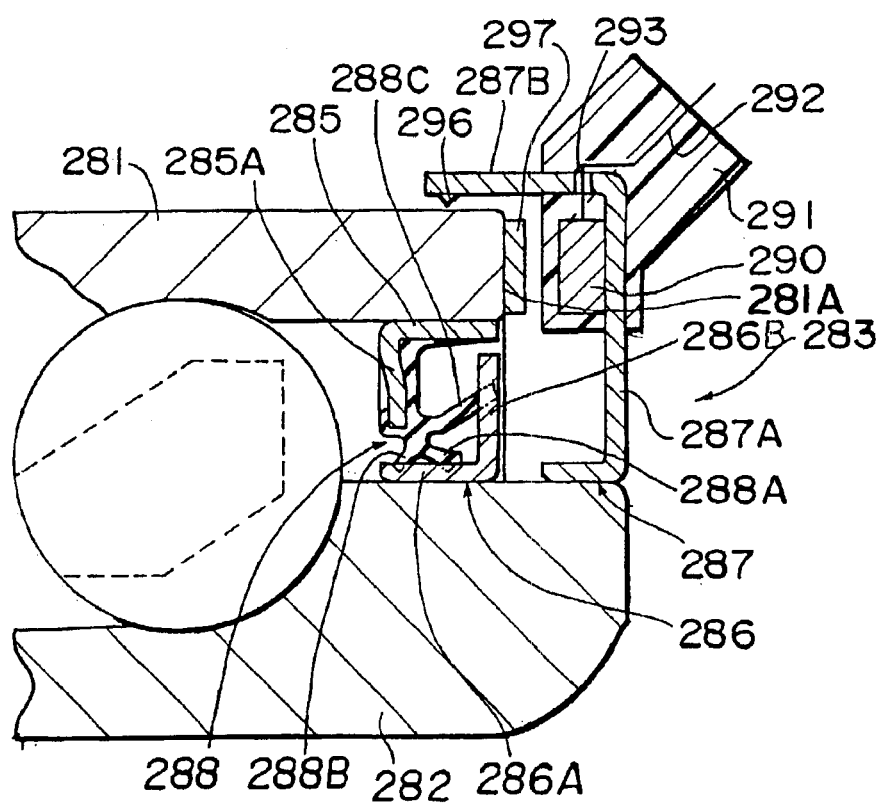
FIG. 18 is a sectional view of a wheel speed detector according to a sixteenth embodiment of the present invention.

Next, FIG. 18 shows the wheel speed detector of the sixteenth embodiment of the present invention. The present sixteenth embodiment is integrated with the inside of a seal device 283 for sealing a gap between a rotating side outer wheel 281 and a stationary side inner wheel 282.

This seal device 283 is provided with a core bar 285 fixed to the inner peripheral surface of the outer wheel 281 as well as a first slinger 286 and a second slinger 287 that are fixed to the outer peripheral surface of the inner wheel 282. The core bar 285 is provided with a radial portion 285A, and a seal lip 288 is fixed to the radial portion 285A. This seal lip 288 has a main lip 288A and an auxiliary lip 288B that are brought in sliding contact with a cylindrical portion 286A of the first slinger 286 and an axial lip 288C brought in sliding contact with a radial portion 286B of the first slinger 286.

On the other hand, the second slinger 287 is fixed to the axial end of the outer peripheral surface of the inner wheel 282 and is provided with a radial portion 287A that extends radially outwardly and an axial portion 287B that extends axially inwardly. A magnetic sensor 290 is fixed to the inner surface of this radial portion 287A, and this magnetic sensor 290 is covered with a resin portion 291. A signal line 292 extending from this magnetic sensor 290 is led obliquely outwardly in the axial direction through a hole 293 formed through the axial portion 287B and buried in the resin portion 291 that is projecting obliquely outwardly in the axial direction. An annular projection 296 that faces the outer peripheral surface of the outer wheel 281 with interposition of a slight gap in the circumferential direction is fixed to the inner surface of the axial portion 287B of the second slinger 287.

A magnetized pulser ring 297 is fixed to an axial end surface 281A of the outer wheel 281 so as to face the magnetic sensor 290.

The present sixteenth embodiment, in which the magnetized pulser ring 297 is made to directly adhere to the outer wheel 281 located on the rotating side, has a simple structure and a reduced number of components. The annular projection 296 formed on the second slinger 287 forms the labyrinth structure and is able to prevent water and dust from entering the magnetized pulser ring 297.

Figure 19:
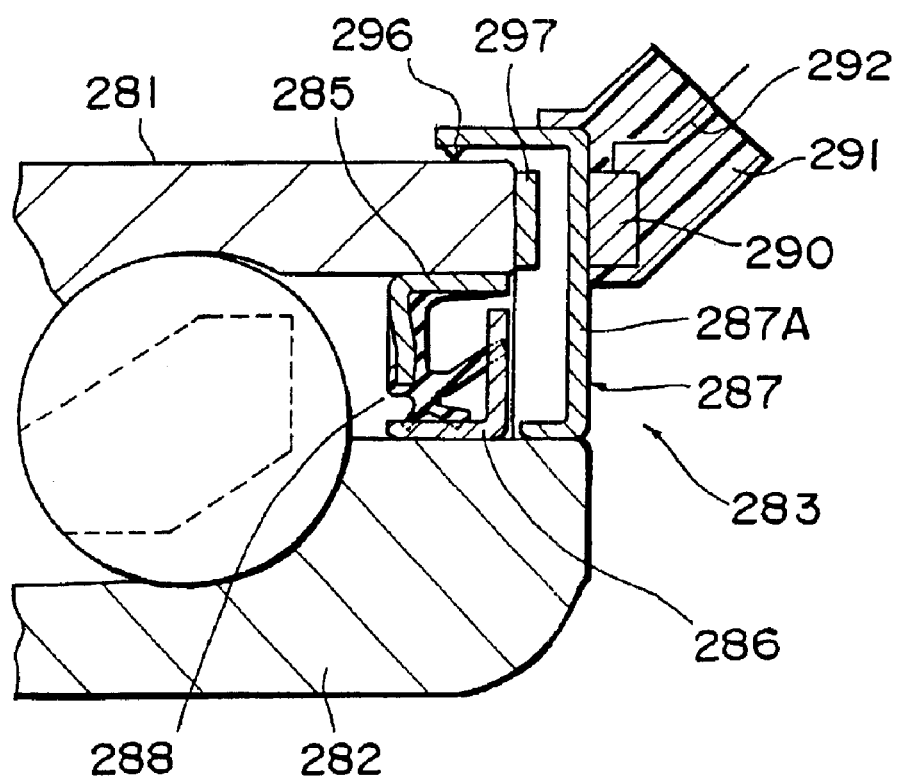
FIG. 19 is a sectional view of a modification example of the sixteenth embodiment.

In the present sixteenth embodiment, the magnetic sensor 290 is fixed to the inner surface of the radial portion 287A of the second slinger 287. However, as shown in FIG. 19, the magnetic sensor 290 may be fixed to the outer surface of the radial portion 287A. In this case, the second slinger 287 can be put close to the outer wheel 281, allowing the compacting to be achieved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A wheel speed detector for detecting a relative rotating speed between an outer ring and an inner ring by means of a magnetic sensor in association with an opposite magnetic ring, wherein one of the outer ring and the inner ring is rotatable while the other is stationary, the magnetic ring is fixed to the rotatable ring and the magnetic sensor is fixed to the stationary ring, the magnetic ring and the magnetic sensor being situated within a gap between the inner ring and the outer ring and sealed within the gap with a seal device, wherein the magnetic ring is magnetized so that a north pole and a south pole are alternately arranged in a circumferential direction, the seal device is constructed of a rotatable seal member and a stationary seal member, the magnetic sensor is fixed to the stationary seal member, the magnetic ring is fixed to the rotatable seal member, and the magnetic ring is covered with a nonmagnetic elastic member.

2. A wheel speed detector as claimed in claim 1, wherein the stationary seal member is made of austenite-based stainless steel, copper or aluminum.

3. A wheel speed detector for detecting a relative rotating speed between an outer ring and an inner ring by means of a magnetic sensor in association with an opposite magnetic ring, wherein one of the outer ring and the inner ring is rotatable while the other is stationary, the magnetic ring is fixed to the rotatable ring and the magnetic sensor is fixed to the stationary ring, the magnetic ring and the magnetic sensor being situated within a gap between the inner ring and the outer ring and sealed within the gap with a seal device, wherein the seal device is constructed of a rotatable seal member and a stationary seal member, the magnetic sensor is fixed to the stationary seal member, the magnetic ring is fixed to the rotatable seal member, the magnetic ring and the magnetic sensor face each other in a radial direction and a gap between the magnetic ring and the magnetic sensor is sealed by seal lips respectively provided on axially inner end outer side of the rotatable and/or stationary seal members.

4. A wheel speed detector for detecting a relative rotating speed between an outer ring and an inner ring by means of a magnetic sensor in association with an opposite magnetic ring, wherein one of the outer ring and the inner ring is rotatable while the other is stationary, the magnetic ring is fixed to the rotatable ring and the magnetic sensor is fixed to the stationary ring, the magnetic ring and the magnetic sensor being situated within a gap between the inner ring and the outer ring and sealed within the gap with a seal device, wherein the seal device is constructed of a rotatable seal member and a stationary seal member, the magnetic ring is fixed to the rotatable seal member, the magnetic sensor is fixed to the stationary seal member and covered with a seal lip of the stationary seal member and at least part of the magnetic sensor is arranged in a hole formed through the stationary seal member.

5. A wheel speed detector for detecting a relative rotating speed between an outer ring and an inner ring by means of a magnetic sensor in association with an opposite magnetic ring, wherein one of the outer ring and the inner ring is rotatable while the other is stationary, the magnetic ring is fixed to the rotatable ring and the magnetic sensor is fixed to the stationary ring, the magnetic ring and the magnetic sensor being situated within a gap between the inner ring and the outer ring and sealed within the gap with a seal device, wherein the seal device is constructed of a rotatable seal member and a stationary seal member, the magnetic sensor is fixed to the stationary seal member, the magnetic ring is fixed to the rotatable seal member, and the stationary seal member has a removable cover metal fitting, and the magnetic sensor is fixed to a resin filled inside the removable cover metal fitting.

6. A wheel speed detector for detecting a relative rotating speed between an outer ring and an inner ring by means of a magnetic sensor in association with an opposite magnetic ring, wherein one of the outer ring and the inner ring is rotatable while the other is stationary, the magnetic ring is fixed to the rotatable ring and the magnetic sensor is fixed to the stationary ring, the magnetic ring and the magnetic sensor being situated within a gap between the inner ring and the outer ring and sealed within the gap with a seal device, wherein the seal device is constructed of a rotatable seal member and a stationary seal member, the magnetic sensor is fixed to the stationary seal member, the magnetic ring is fixed to the rotatable seal member, and the magnetic ring and the magnetic sensor face each other in the radial direction, wherein the rotatable and/or stationary seal members comprise a unitary seal lip member which has a first seat lip and a second seal lip, the first seal lip and a second seal lip being positioned on opposite sides of the gap in the axial direction.

7. A wheel speed detector as claimed in claim 6, wherein the magnetic ring is covered by the unitary seal lip member.

* * * * *